(12) United States Patent
Radke et al.

(10) Patent No.: US 7,617,881 B2
(45) Date of Patent: Nov. 17, 2009

(54) ARTICULATED CRAWLER TRACTOR

(75) Inventors: Daniel Dean Radke, Dubuque, IA (US); Scott Svend Hendron, Dubuque, IA (US); Kenneth Edward Poppe, Dubuque, IA (US); Lawrence William Bergquist, Dubuque, IA (US); James Arthur Nagorcka, Tarrington Victoria (AU); Lyal Douglas Allen, Hamilton Victoria (AU)

(73) Assignee: Deere & Company, Moline, IL (US)

( * ) Notice: Subject to any disclaimer, the term of this patent is extended or adjusted under 35 U.S.C. 154(b) by 615 days.

(21) Appl. No.: 11/286,731

(22) Filed: Nov. 23, 2005

(65) Prior Publication Data

US 2006/0113121 A1 Jun. 1, 2006

Related U.S. Application Data

(60) Provisional application No. 60/631,461, filed on Nov. 29, 2004.

(51) Int. Cl.
*A01B 59/048* (2006.01)
*B60G 17/00* (2006.01)

(52) U.S. Cl. ..................................... 172/810; 280/6.159

(58) Field of Classification Search ................. 172/810, 172/788, 793, 780; 180/89.12, 305; 280/6.159, 280/124.106, 400
See application file for complete search history.

(56) References Cited

U.S. PATENT DOCUMENTS

| 3,869,010 | A | * | 3/1975 | Stedman | 180/6.7 |
| 5,632,350 | A | * | 5/1997 | Gauvin | 180/9.44 |
| 5,984,032 | A | * | 11/1999 | Gremillion et al. | 180/14.1 |
| 6,810,975 | B2 | * | 11/2004 | Nagorcka et al. | 180/9.5 |
| 7,192,034 | B2 | * | 3/2007 | Radke et al. | 280/6.159 |

* cited by examiner

*Primary Examiner*—Robert E Pezzuto

(57) ABSTRACT

An articulated dozer with a four point independent suspension system between a chassis and two support frames is described. The chassis includes a front chassis portion and a rear chassis portion connected by an articulation joint. The vehicle is compactly arrange so that the chassis and the two support frames fit between the track systems supporting and propelling the vehicle. Additionally, the engine is arranged near the articulation joint and lower than the top of the track systems for improved view and visibility. The cab is arranged over the track systems at the front of the vehicle for an optimal view of the blade.

10 Claims, 6 Drawing Sheets

ARTICULATED CRAWLER TRACTOR

This document claims priority based on U.S. Provisional Application Ser. No. 60/631,461, filed Nov. 29, 2004, and entitled ARTICULATED CRAWLER TRACTOR, under 35 U.S.C. 119(e).

FIELD OF THE INVENTION

The invention relates to crawler dozers. More specifically, it relates to an articulated dozer.

BACKGROUND OF THE INVENTION

Conventional dozers have poor visibility with respect to the dozer blades; traditionally, only the ends of the blade are visible from the cab of a dozer as the view is obstructed by the front (i.e., the hood, etc.) of the vehicle. Moreover, conventional dozers have a high center of gravity as the center of gravity for the engine and pumps tend to be high, making it difficult to doze sideways on a slope due to an increased risk of vehicle tilting. Finally the ground-track contact area on traditional dozers can be reduced in rough and/or hilly areas, i.e., areas where the contours of the ground are likely to change at distances smaller than the maximum possible contact length for the track on perfectly flat ground.

SUMMARY OF THE INVENTION

The track/steering system has been demonstrated to be the best method of transferring high tractive efforts to the ground while minimizing power losses due to steering. This has been demonstrated during scraper tractor comparisons which have included both 2 track systems (Cat Challenger, Deere 9000T) as well as 4 track articulated machines (Case IH Quad Track).

Described and claimed herein is a four track articulated dozer/grader with visibility that includes the full length of the blade having all four tracks independently suspended. The vehicle includes two portions, a front portion and a rear portion operatively connected via a conventional articulation mechanism. The center of gravity of the vehicle is low and the vehicle body is narrow allowing much of the body of the vehicle to fit between the tracks vertically as well as laterally.

Improvement in traction is achieved by a decrease in the length of each independently suspended track unit contacting the ground coupled with an increase in the number of track units as compared to the 2-track crawler. Having four separate, smaller track units results in an increase in the effective traction because more track is actually contacting soil than with a conventional crawler, especially on uneven soil surfaces. Such a configuration allows the machine weight and cost to be reduced for equivalent machine performance and improves the ride of the vehicle.

A crawler dozer frequently operates on sloped surfaces. To maximize the ability to safely operate on side slopes, a unique configuration is utilized. The front suspension system is designed to eliminate roll at the front axle. The rear axle provides the necessary axle oscillation required to maintain ground contact on uneven surfaces. Further, as mentioned above, the center of gravity for the machine is very low.

Thus, the vehicle described and claimed herein is, in comparison to more conventional machines, narrower, more stable (even on slopes), lighter, a better ride, and has greater amount of ground contact. Additional, blade visibility is improved over conventional two track crawlers.

BRIEF DESCRIPTION OF THE DRAWINGS

Embodiments of the invention will be described in detail, with references to the following figures, wherein.

DESCRIPTION OF THE PREFERRED EMBODIMENT

Figure 1:
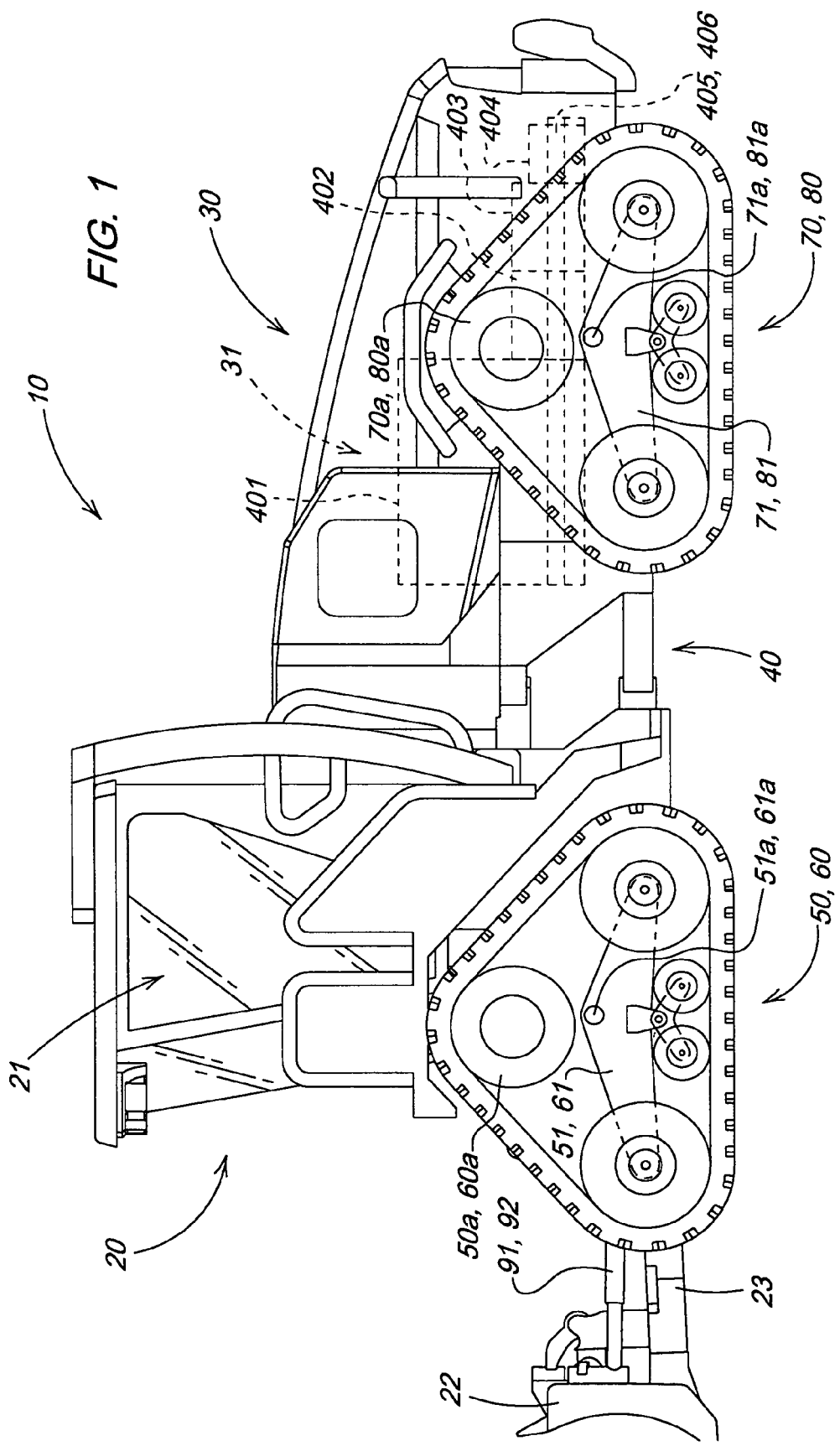
FIG. 1 is a side view of a work vehicle in which the invention may be used.
Figure 9:
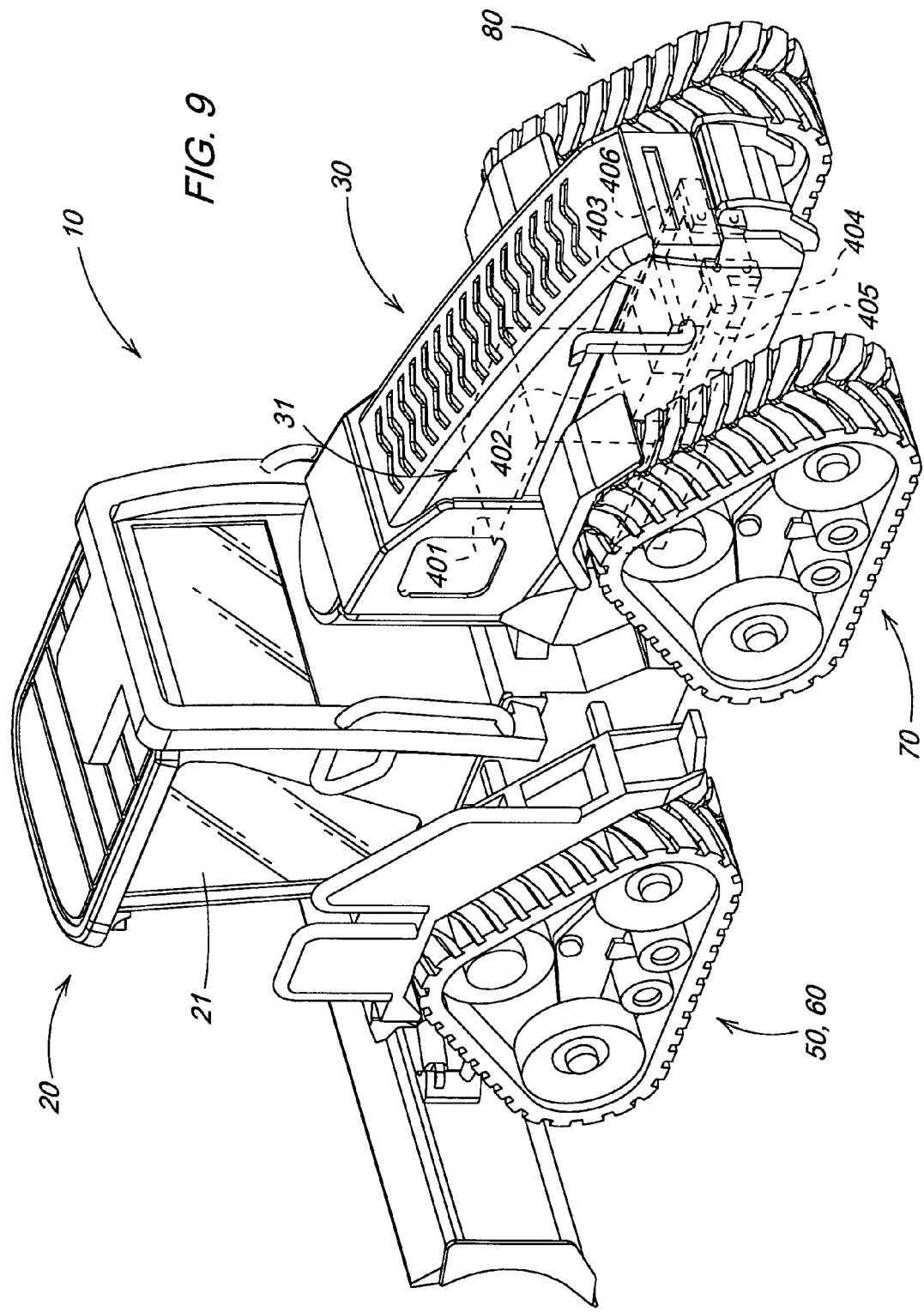
FIG. 9 is an oblique view of the vehicle in FIG. 1.

FIGS. 1 and 9 illustrate an exemplary embodiment of the invention. The particular vehicle illustrated in FIGS. 1 and 9 is a four track articulated dozer 10 having a front portion 20 a rear portion 30; a conventional articulation mechanism 40 between the front portion 20 and the rear portion 30; first and second track systems 50, 60; and third and fourth track systems 70, 80. The front portion 20 includes a blade 22 and a blade mounting frame 23 as well as an operator cab 21. The rear portion 30 includes: an engine 401; a first hydrostatic pump 402 operatively connected to the engine; a second hydrostatic pump 403 operatively connected to the first hydrostatic pump 402; and a third hydraulic pump 404 operatively connected to the second hydraulic pump 403. Two power train brackets 405, 406 are, each, rigidly connected to their respective sides of the engine and rigidly connected to the third hydraulic pump 404 as illustrated in FIG. 9.

Figure 3:
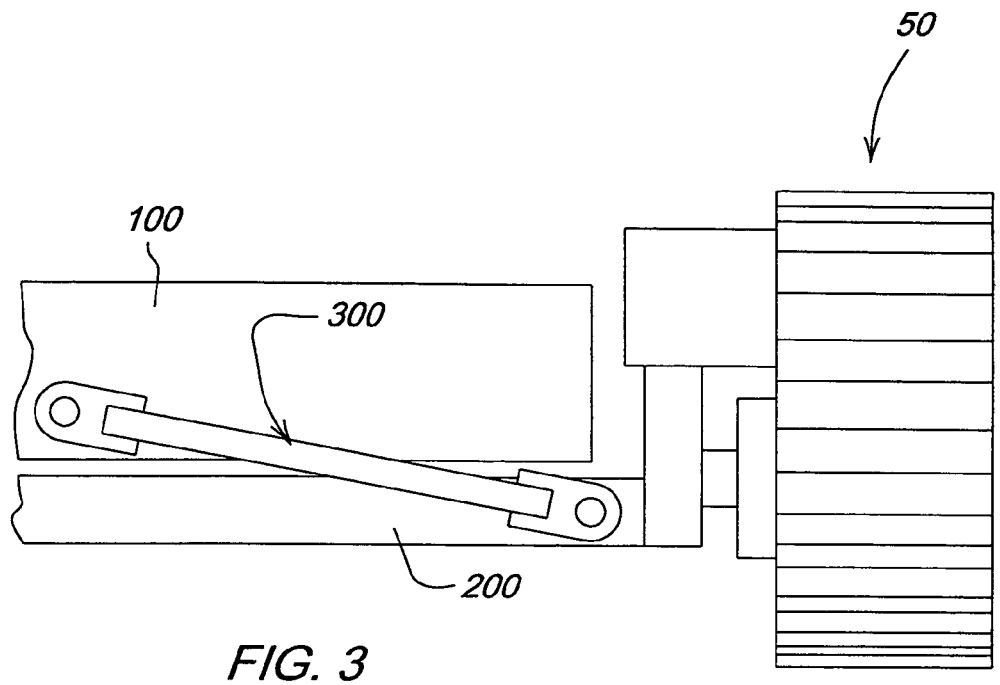
FIG. 3 is a front view of a front portion of the chassis and a first A-frame connected by a pan hard rod.
Figure 4:
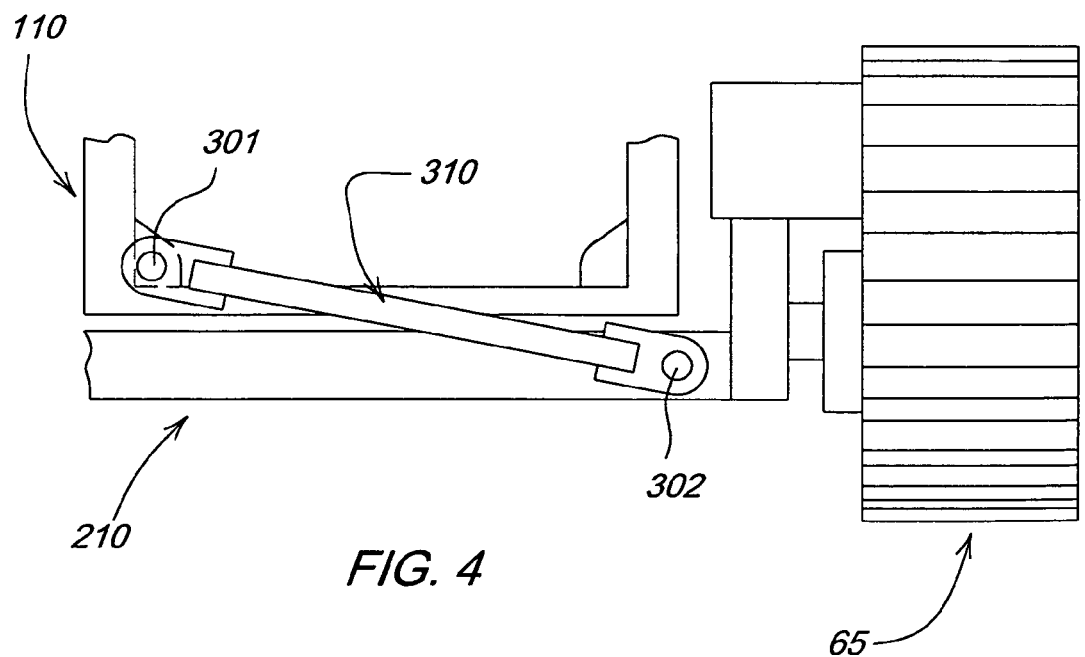
FIG. 4 is a rear view of a rear portion of the chassis and a second A-frame connected by a pan hard rod.
Figure 5:
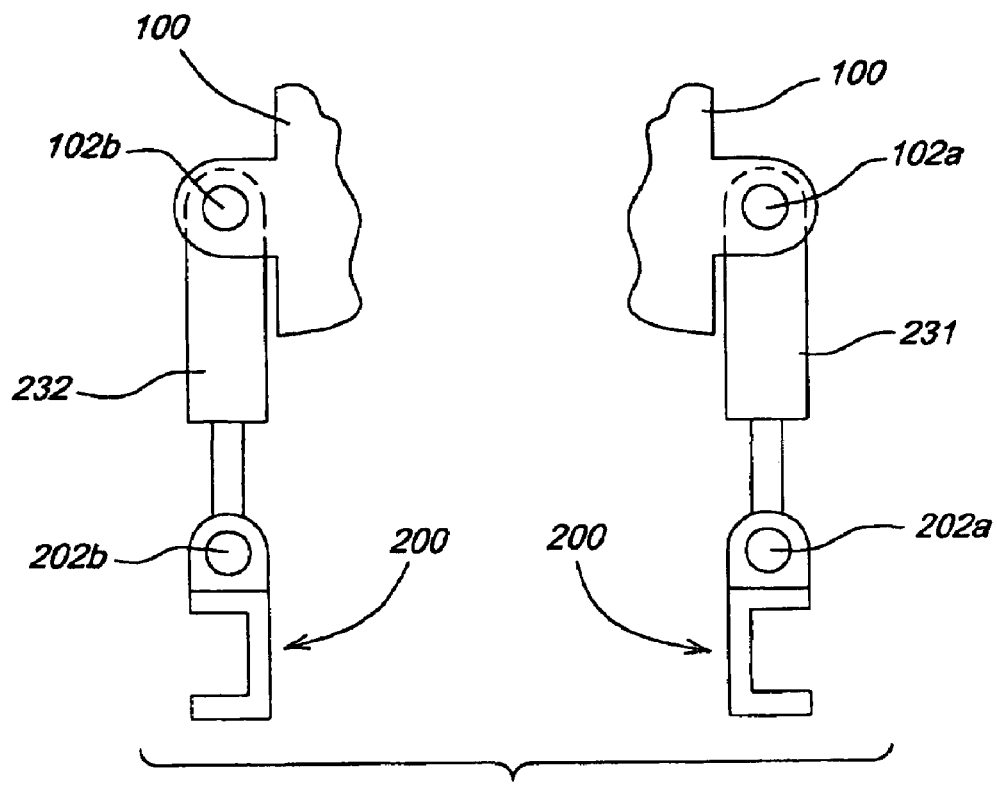
FIG. 5 is a front view of the front portion of the chassis and the first A-frame connected by two suspension cylinders.

An A-frame structure or a first A-frame 200 that is pivotally connected to both the first and second track frames or rocker arms 51, 61 at first and second pivots 51*a*, 61*a*. The first A-frame 200 is connected to a front chassis portion 100 primarily at the top of the "A", i.e., at a narrower portion of the first A-frame 200, with a first spherical ball joint 101. The first spherical ball joint 101 is located in proximity to but forward of the articulation joint 40. Laterally the first A-frame 200 is connected to the first chassis portion 100 with a first linkage (first pan-hard rod) 300 (see FIG. 3) to keep the position of the first A-frame 200 approximately centered under the front chassis portion 100, restricting relative lateral motion. The front chassis portion 100 is vertically connected to the first A-frame 200 by: a first suspension cylinder 231 having a first cylinder head end 231*a* and a first cylinder rod end 231*b*; and a second suspension cylinder 232 having a second cylinder head end 232*a* and a second cylinder rod end 232*b*. The first and second suspension cylinders 231, 232 are hydraulically connected, respectively, to first and second accumulators 251, 252. A mechanism senses the position of the first A-frame 200 relative to the front chassis portion 100 at each suspension cylinder location, and controls the vehicle height by adding or removing hydraulic fluid, via hydraulic balancing circuit 240, to and from the first and second suspension cylinders 231, 232 on a continuous basis. These cylinders primarily support the vehicle weight.

Control of vehicle roll position at the front axle 203 is desirable on hills and slopes. To accomplish this, the first cylinder head end 231a is hydraulically connected to the second cylinder rod end 232b. Conversely the second cylinder head end 232a is hydraulically connected to first cylinder the rod end 231b of the first cylinder 231. This methodology reduces the effective cylinder area to be equal to the rod area of the cylinder. This creates a higher pressure in the system which is desirous for improved suspension control.

The first and second suspension cylinders 231, 232 are attached to the first A-frame 200 at points, respectively, behind first and second track frame pivots 51a, 61a so that the cylinders 231, 232 operate at an increased pressure level. This contributes to the roll stability mentioned above by increasing the pressure proportionally.

A second A-frame structure 210 is pivotally connected to both the third and fourth track frames, i.e., rocker arms 71,81 at pivots 71a, 81a. The second A-frame 210 is connected to a rear chassis portion 110 primarily at the top of the "A", i.e., at a narrower portion of the second A-frame 210 via a spherical ball joint 211. The second spherical ball joint 211 is located in proximity to but rearward of the articulation joint 40. Laterally the second A-frame 210 is connected to the rear chassis portion 110 via a linkage (pan-hard rod) 310 to keep the second A-frame 210 approximately centered under the rear chassis portion 110. The rear chassis portion 110 is vertically connected to the second A-frame 210 by a third hydraulic suspension cylinder 233 having a third cylinder head end 233a and a third cylinder rod end 233b; and a fourth hydraulic suspension cylinder 234 having a fourth cylinder head end 234a and a fourth cylinder rod end 234b. The third and fourth suspension cylinders 233, 234 are hydraulically connected together and are hydraulically connected, respectively to third and fourth hydraulic accumulators 253, 254. A mechanism senses the position of the second A-frame 210 relative to the second chassis portion 110 at a point midway between the suspension cylinders 233, 234 indicating the average distance between the second chassis portion 110 and the third and fourth frame pivots 71a, 81a, and controls the vehicle height, via hydraulic balancing circuit 241, by adding or removing hydraulic fluid to and from the the third and fourth suspension cylinders 233, 234 on a continuous basis.

Figure 7:
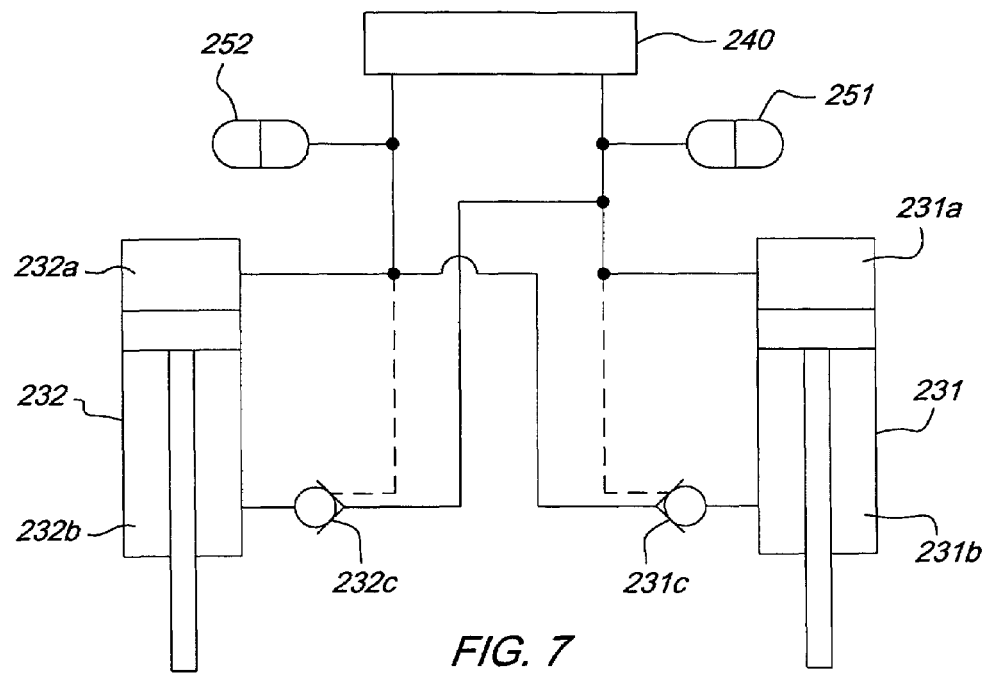
FIG. 7 is an exemplary schematic of the cylinders illustrated in FIG. 5.
Figure 8:
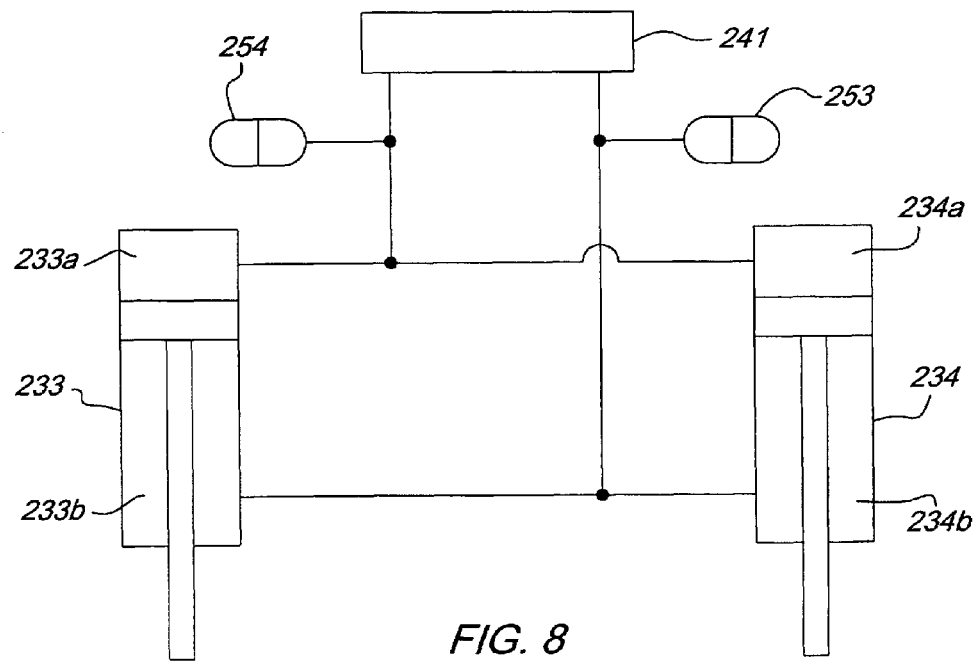
FIG. 8 is an exemplary schematic of the cylinders illustrated in FIG. 6.

It is desirable to have the rear axle oscillate to ensure all 4 tracks maintain ground contact at all times. This is done by connecting the head end of the third and fourth suspension cylinders 233, 234 together to allow oil to flow from one to the other as needed. The rod ends of the third and fourth cylinders 233, 234 are also connected together likewise. Thus, the third and fourth cylinder head ends 233a, 234a are hydraulically connected and the third and fourth cylinder rod ends 233b, 234b are hydraulically connected (see FIG. 7).

Figure 2:
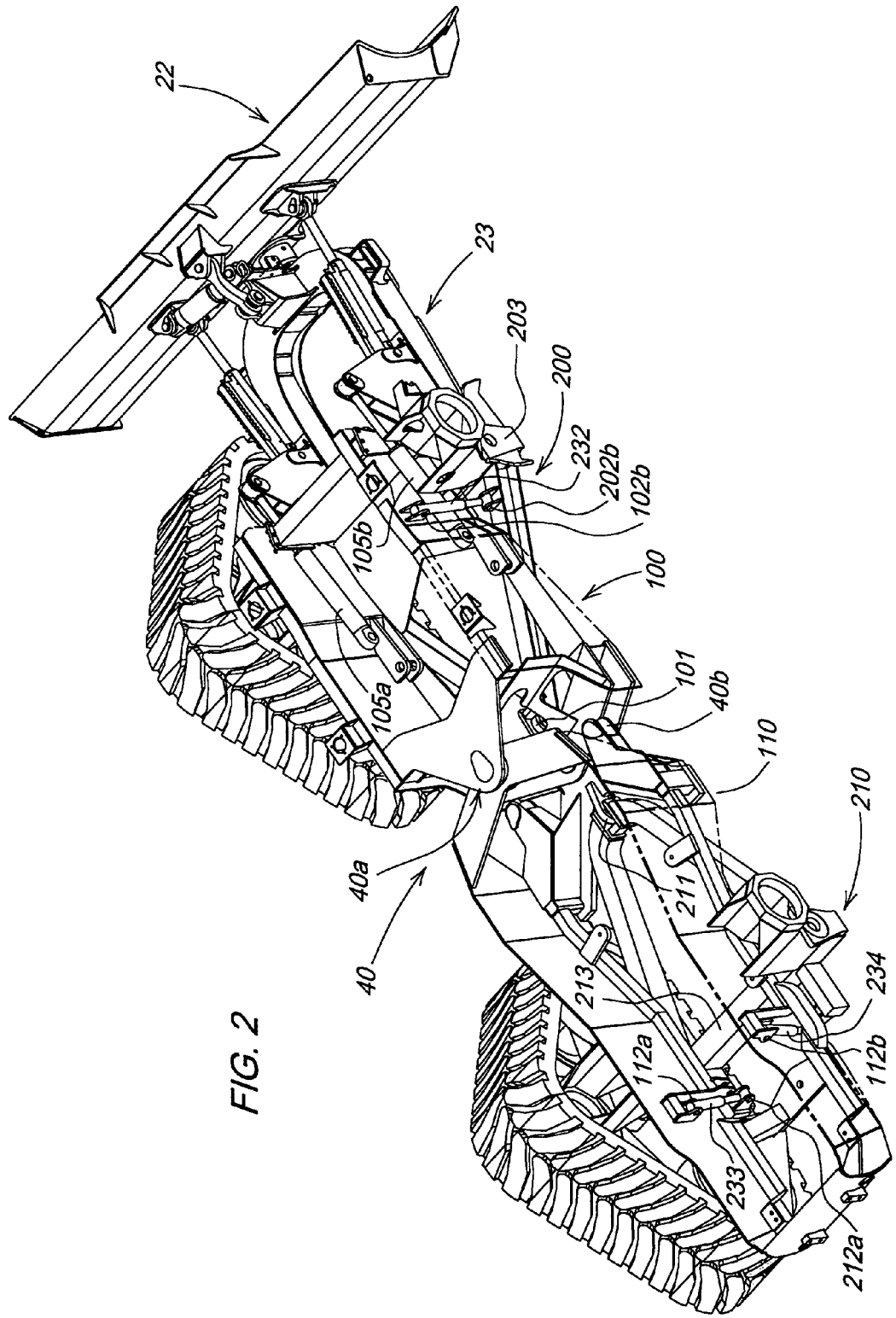
FIG. 2 is an elevated oblique view of an articulated chassis, two A-frames and C-frame of the vehicle illustrated in FIG. 1.
Figure 6:
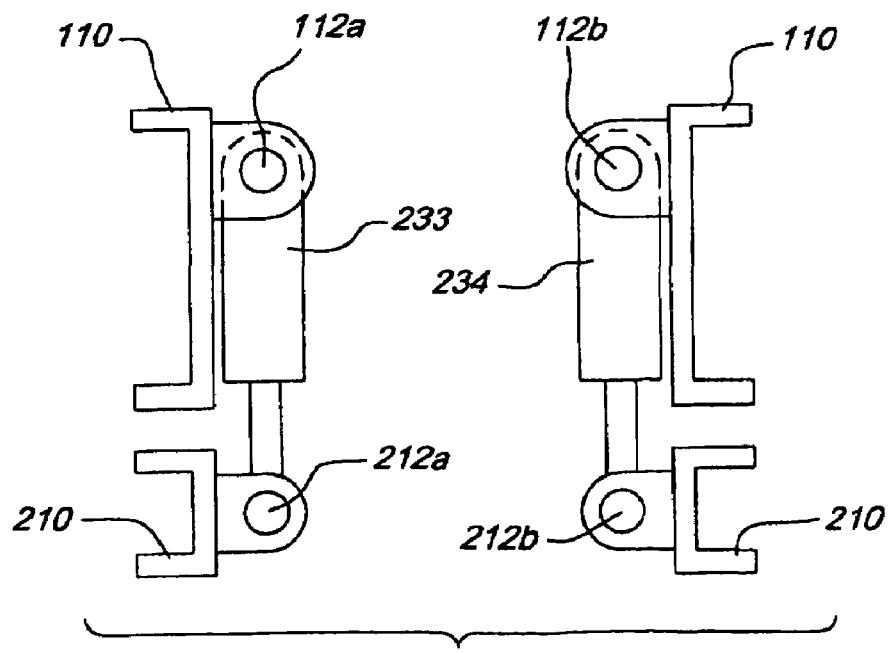
FIG. 6 is a rear view of a rear portion of the chassis and a second A-frame connected by two suspension cylinders.

The third and fourth suspension cylinders 233,234 are attached to the second A-frame 210 at a point behind the rocker arm pivots 71, 81 so that they operate at a reduced pressure level. This lowers the pressure of the system for a smoother ride. In the exemplary embodiment illustrated in FIGS. 2 and 6, the third hydraulic suspension cylinder 233 is connected to the rear chassis 110 at pivot 112a and to the second A-frame 210 at pivot 212a. Similarly, the fourth hydraulic suspension cylinder 234 is connected to the rear chassis 110 and the second A-frame at pivots 112b and 212b respectively. This lowers the pressure of the system for a smoother ride.

First and second balancing circuits 240,241 are hydraulic circuits that maintain the nominal distances between the front chassis portion 100 and the front A-frame 200 and the rear chassis portion 110 and the rear A-frame 210.

The blade mounting structure, referred to as the C-frame 23, is structurally and operatively attached to the first A-frame 200. This ensures the blade level (right to left with respect to the operator) will be consistent with the first and second track systems 50, 60 and not affected by vehicle chassis motion enabled by the suspension system.

All of the hydrostatic pumps 402, 403, 404 are powered by the engine 401. The first hydrostatic pump 402 supplies hydraulic energy to the final drives 50a, 60a of the first and second track systems 50, 60. The second hydrostatic pump supplies hydraulic energy to the final drives 70a, 80a of the third and fourth track systems 70, 80. The third hydraulic pump 404 supplies hydraulic energy to the actuators, i.e. first and second cylinders 105a, 105b, for manipulating the blade 22 and other functions such as, for example, steering and braking.

The engine 401 and the powertrain, i.e., the first, second and third hydrostatic pumps 402, 403 and 404 are located in the rear portion 30 behind the operator with a very low center of gravity. In addition, the heaviest components of the drive train are located as close to the articulation joint as practical in the rear portion 30. Further, the centers of gravity for the engine 401 and the hydraulic pumps 402, 403, 404 are lower than the tops of the two rear track assemblies 70, 80. Moreover, the engine 401 is located in proximity to the vehicle articulation joint 40 and the center of gravity for the combination of the engine 401 and the hydraulic pumps 402, 403, 404 is located between the centers of all four of the track assemblies, i.e., located forward of the final drives for the two rear tracks and rearward of the final drives for the two front tracks. Additionally, the cab is located over the first and second final drives 50a, 60a. Such an arrangement allows optimal visibility of the blade 22. It also allows sloping of the rear of the vehicle to provide optimal rear visibility.

Locating the weight of heavier components lower and closer to the articulation joint 40 increases the stability of the machine. This is especially important on side slope conditions when turning. Under side slope conditions this machine is much more stable as compared to a loader which has the rear frame weight high and at the rear. When a loader is articulated, the rear counterweight swings to the side and increases the tendency to roll the machine. The loader is optimized for different operating conditions. This is also true for conventional loaders where the engine is mounted to the front of the vehicle but it and other heavier components are mounted such that they have a relatively high center of gravity.

The steering system is a proven conventional articulation system. This eliminates the need for complex powertrain systems, and allows them to be replaced with conventional systems if desired.

To meet the desired narrow width requirements for on road transport, while accommodating rear axle oscillation, the rear powertrain width must be minimized. An in-line hydrostatic system was utilized for this machine; that is the engine 401, the first hydraulic pump 402, the second pump 403 and the third pump 404 are all arranged in line as indicated in FIG. 1. One hydrostatic pump drives the front wheel motor drives, the other drives the rear wheel motor drives.

Utilizing smaller components could enable usage of proven high volume track drive components at a significant cost savings.

Both steel and rubber tracks could be utilized based on need.

The cooling package 31 utilized is located at the top of the rear portion 30. Locating the cooling package 31 above the engine 401 enabled significant design flexibility and enhanced visibility as compared to conventional alternatives.

Having described the illustrated embodiment, it will become apparent that various modifications can be made without departing from the scope of the invention as defined in the accompanying claims. The powertrain could, for example, be an Electric Drive with the necessary generation system, controllers, and motors replacing the illustrated hydrostatic components.

The invention claimed is:

1. A articulated dozer, comprising:
   an engine;
   at least one hydraulic pump operatively connected to the engine;
   a front body portion having a first track system and a second track system, the first track system having a first final drive, the second track system having a second final drive;
   a rear body portion having a third track system and a fourth track system, the third track system having a third final drive, the fourth track system having a fourth final drive, the rear body portion containing the engine and the at least one hydraulic pump; and
   an articulation joint operatively connecting the front body portion and the second body portion, the engine and the at least one hydraulic pump located in proximity to the articulation joint, a center of gravity of the engine being located at a height lower than the top of the third and fourth track assemblies.

2. The articulated dozer of claim 1, wherein a center of gravity for a combination of the engine and the at least one hydraulic pump is laterally located between the first, second, third and fourth track assemblies.

3. The articulated dozer of claim 2, wherein a center of gravity for a combination of the engine and the at least one hydraulic pump is vertically located below the top of each of the first, second, third and fourth track assemblies.

4. The articulated dozer of claim 1 further comprising a cab, wherein the cab is located over the first and second track systems.

5. The articulated dozer of claim 4 further comprising a blade, wherein an entire length of the blade is visible from the cab.

6. The articulated dozer of claim 1, wherein the rear body portion, the engine and the at least one hydrostatic pump are located between the third and fourth track systems.

7. The articulated dozer of claim 6, wherein the engine and the at least one hydrostatic pump are positioned in line along a centerline of the rear body portion.

8. The articulated dozer of claim 6, further comprising a front chassis portion, the front chassis portion located between the first and second track systems.

9. An articulated dozer, comprising:
   a first chassis portion;
   a second chassis portion connected to the first chassis portion via an articulation joint;
   a first A-frame;
   a second A-frame, a length of the second A-frame frame being approximately equal to a length of the first A-frame frame, the front chassis portion and the rear chassis portion, respectively suspended above the first and second A-frames;
   a first pivot;
   a second pivot, a narrow portion of the first A-frame connected to the front chassis portion via the first pivot, a narrow portion of the second A-frame connected to the rear chassis via the second pivot, the first pivot and the second pivot in proximity to the articulation joint;
   a first suspension cylinder having a first cylinder head end and a first cylinder rod end, the first suspension cylinder operatively attached to a first side of the first chassis portion and a first side of the first A-frame; and
   a second suspension cylinder having a second cylinder head end and a second cylinder rod end, the second suspension cylinder operatively attached to a second side the first chassis portion and a second side of the first A-frame, the first cylinder head end hydraulically connected to the second cylinder rod end, the first cylinder rod end hydraulically connected to the second cylinder head end.

10. The articulated dozer of claim 9, further comprising:
    a third suspension cylinder having a third cylinder head end and a third cylinder rod end, the third suspension cylinder operatively attached to a first side of the second chassis portion and a first side of the second A-frame; and
    a fourth suspension cylinder having a fourth cylinder head end and a fourth cylinder rod end, the fourth suspension cylinder operatively attached to a second side the second chassis portion and a second side of the second A-frame, the third cylinder head end hydraulically connected to the fourth cylinder head end, the third cylinder rod end hydraulically connected to the fourth cylinder rod end.

* * * * *